United States Patent Office.

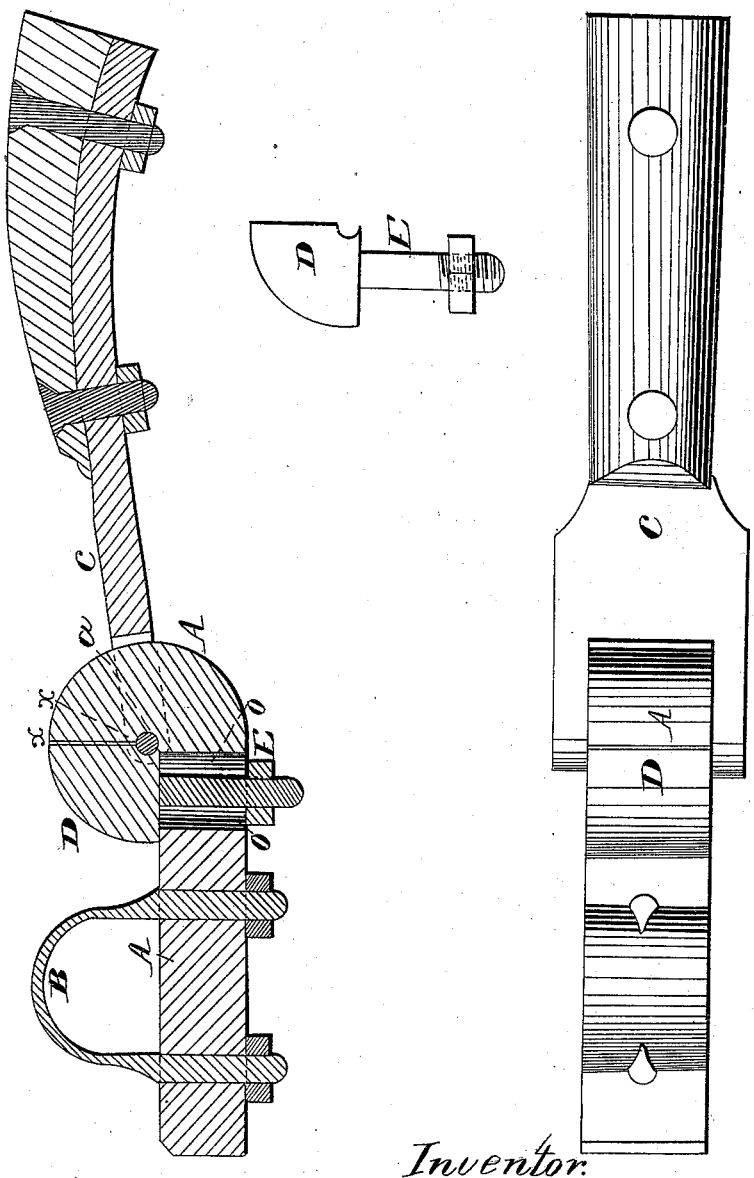

JOHN D. BRUNNER, OF DOYLESTOWN, PENNSYLVANIA.

Letters Patent No. 66,789, dated July 16, 1867.

IMPROVEMENT IN ATTACHING THILLS TO VEHICLES.

The Schedule referred to in these Letters Patent and making part of the same.

TO ALL WHOM IT MAY CONCERN:

Be it known that I, JOHN D. BRUNNER, of Doylestown, in the county of Bucks, and in the State of Pennsylvania, have invented certain new and useful improvements in Shaft-Couplings; and do hereby declare that the following is a full, clear, and exact description thereof, reference being had to the accompanying drawings and to the letters of reference marked thereon. In the annexed drawings, making part of this specification—

A represents a metallic car, which is secured to the under side of the front axle of the vehicle by means of the loop B, with its nuts upon each of its ends. This bar is provided with a slot or opening, o o, cut through it from top to bottom, said slot running lengthwise of the bar. The forward end of this bar is curved, as seen, and provided with a square shoulder, from X to X'. At the lower end of the shoulder X', a semicircular groove is cut across the bar for the end of the shaft-iron or a bolt to rest in. E represents a bolt, which passes through the opening o from the upper side of the bar A, and is provided with a head, D, which said head is provided with a square shoulder and a semicircular groove to correspond with those of the bar A. C represents a shaft-iron, which is either provided with a loop or with two jaws at its rear end, through which a bolt may pass to secure it to the bar A. A loop is here represented, the cross-bar of which at the end of the shaft-iron is made in proper shape to fit in the circular groove formed in the head of the nut and the shoulder of the bar A. The cross-bar of the loop of the shaft-iron is secured in the circular groove mentioned by forcing up the shoulder, of the head D as near to the shoulder of the bar A as it will go, and then tightening the nut on the lower end of bolt E. The bar a of the loop may be too large to allow the shoulders to meet, but the head will fit with its groove against it on one side, and may be moved up to it, as fast as it wears, to prevent any rattling. This arrangement of devices forms a cheap and simple shaft-coupling, while it makes a complete anti-rattler.

Having thus fully described my invention, what I claim as new, and desire to secure by Letters Patent, is—

The bar A provided with the slot o, as herein described, when used with the head D and bolt E, in the manner and for the purposes specified.

In testimony that I claim the foregoing I have hereunto set my hand this twelfth day of March, 1867.

JOHN D. BRUNNER.

Witnesses:
RODMAN F. PUGH,
JOHN B. PUGH.